United States Patent
Chang

(10) Patent No.: US 10,272,507 B2
(45) Date of Patent: Apr. 30, 2019

(54) SCROLL SAW

(71) Applicant: Chiung-Yu Chang, Taichung (TW)

(72) Inventor: Chiung-Yu Chang, Taichung (TW)

( * ) Notice: Subject to any disclaimer, the term of this patent is extended or adjusted under 35 U.S.C. 154(b) by 240 days.

(21) Appl. No.: 15/393,091

(22) Filed: Dec. 28, 2016

(65) Prior Publication Data

US 2018/0178298 A1 Jun. 28, 2018

(51) Int. Cl.
*B23D 49/00* (2006.01)
*B23D 51/12* (2006.01)
*B23D 51/16* (2006.01)

(52) U.S. Cl.
CPC .......... *B23D 51/16* (2013.01); *B23D 49/007* (2013.01); *B23D 51/12* (2013.01)

(58) Field of Classification Search
CPC .... B23D 51/163; B23D 51/166; B23D 51/18; B23D 51/00; B23D 51/007; B23D 51/20; Y10T 83/705; Y10T 83/7055; Y10T 83/706; Y10T 83/7065
See application file for complete search history.

(56) References Cited

U.S. PATENT DOCUMENTS

| | | | | |
|---|---|---|---|---|
| 4,516,612 A * | 5/1985 | Wiley | ................. | B23D 45/062 144/1.1 |
| 4,949,616 A * | 8/1990 | Chang | ................. | B23D 51/125 83/748 |
| 5,058,476 A * | 10/1991 | Legler | ................. | B23D 49/007 83/581.1 |
| 5,065,652 A * | 11/1991 | Legler | ................. | B23D 49/007 83/168 |
| 5,228,376 A * | 7/1993 | Huang | ................. | B23D 49/007 83/662 |
| 5,390,577 A * | 2/1995 | Huang | ................. | B23D 49/007 83/628 |
| 6,467,176 B1 * | 10/2002 | Frech | ................. | B23D 51/01 30/122 |
| 6,474,211 B1 * | 11/2002 | Lin | ................. | B23D 49/007 83/628 |
| 6,658,979 B1 * | 12/2003 | Frech | ................. | B23D 51/01 30/122 |
| 7,958,808 B2 * | 6/2011 | Chen | ................. | B23D 49/007 83/699.21 |
| 2008/0145167 A1 * | 6/2008 | Lin | ................. | B23C 1/06 409/234 |

(Continued)

*Primary Examiner* — Jason Daniel Prone
*Assistant Examiner* — Richard D Crosby, Jr.
(74) *Attorney, Agent, or Firm* — Ming Chow; Sinorica, LLC

(57) ABSTRACT

A scroll saw has a machine base. The machine base includes two parallel transmission shafts thereon. The two transmission shafts are connected to each other through a synchronous unit. The synchronous unit has an upper crankshaft and a lower crankshaft connected to the transmission shafts, respectively. A plurality of crankshaft connecting levers are connected between the upper crankshaft and the lower crankshaft. When one of the transmission shafts is rotated, another transmission shaft will be driven to rotate through the synchronous unit. Because the synchronous unit is composed of the crankshaft connecting levers, the connection between the transmission shafts is relatively tight. This ensures that the transmission shafts do not generate a deviation in rotation to avoid vibration and noise.

11 Claims, 14 Drawing Sheets

(56) References Cited

U.S. PATENT DOCUMENTS

| | | | |
|---|---|---|---|
| 2011/0131820 A1* | 6/2011 | Kaiser | B23D 49/165 30/376 |
| 2016/0045963 A1* | 2/2016 | Chang | B23D 51/14 83/783 |
| 2018/0178298 A1* | 6/2018 | Chang | B23D 51/16 |

* cited by examiner

SCROLL SAW

FIELD OF THE INVENTION

The present invention relates to a scroll saw, and more particularly to a scroll saw capable of driving a scroll saw blade to perform linear sawing operation straight up and down.

BACKGROUND OF THE INVENTION

The scroll saw blade of a conventional scroll saw may displace and deviate in the forward and backward direction when in use, so it is not easy for the user to control the position of the scroll saw blade exactly. Therefore, an improved scroll saw is developed as disclosed in U.S. Pat. No. 5,390,577 or as disclosed in U.S. Patent Application Publication No. 20160045963 filed by the inventor of the present invention. The scroll saw has a worktable. The worktable is provided with a pair of transmission shafts respectively disposed above and below the worktable. One end of each transmission shaft is connected to a drive unit, and the other end of each transmission shaft is provided with a clamping unit. The clamping unit has a slide seat. The slide seat is provided with a slider. The scroll saw further includes a scroll saw blade. Two ends of the scroll saw blade are connected to the sliders of the two clamping units, respectively. The drive unit drives the transmission shafts to rotate simultaneously, and the transmission shafts respectively bring the sliders of the clamping units to slide straight up and down relative to the worktable so as to drive the scroll saw blade to perform linear sawing operation straight up and down, such that the user can control the position of the scroll saw blade for precise sawing operation.

However, the inventor of the present invention finds that in actual operation of the above-mentioned scroll saw, the drive unit, namely, the motor gear assembly as disclosed in the U.S. Pat. No. 5,390,577 or the motor belt assembly as disclosed in U.S. Patent Application Publication No. 20160045963, due to a backlash between the gears or an elastic tension of the belt itself, may generate a deviation when the transmission shafts are running, and the transmission shafts do not run in parallel, resulting in a violent vibration during the operation of the scroll saw blade. The vibration not only accompanies a loud noise but also seriously interferes with the user to operate the scroll saw, which also causes a vibration of the scroll saw easily. In addition, the sliders of the clamping units are driven by the transmission shafts to slide back and forth on the slide seats at a high speed to generate a lot of friction heat, so the scroll saw cannot be used for a long time. As a result, the scroll saw cannot be put into mass production for industrial use.

Accordingly, the inventor of the present invention has devoted himself based on his many years of practical experiences to solve these problems.

SUMMARY OF THE INVENTION

The primary object of the present invention is to provide a scroll saw capable of driving a scroll saw blade to perform linear sawing operation straight up and down to overcome the problems of vibration, noise and overheating existed in the conventional scroll saw.

In order to achieve the aforesaid object, the scroll saw of the present invention comprises a machine base, a saw frame, a synchronous unit, a drive unit, two transmission units, two clamping units, and a scroll saw blade. The machine base has a base. A side surface of the base is provided with a mounting hole. A worktable is disposed on top of the base. The worktable is provided with a through hole longitudinally penetrating through the worktable from top to bottom. The saw frame has a fixing seat. The fixing seat is disposed at one side of the base. The fixing seat is provided with an upper fixing arm and a lower fixing arm. The upper fixing arm and the lower fixing arm extend in parallel toward the worktable. The upper fixing arm is suspended above the worktable. The lower fixing arm is inserted and fixed to the mounting hole, and located below the worktable. A free end of each of the upper fixing arm and the lower fixing arm is provided with a slide seat. The slide seat is longitudinally provided with a slide groove corresponding to the through hole. The synchronous unit is disposed in the fixing seat. The synchronous unit has at least one upper pivot seat. The upper pivot seat is disposed on the fixing seat and corresponds in position to the upper fixing arm. The upper pivot seat has an upper pivot hole therein. An upper crankshaft is provided and inserted through the upper pivot seat. The synchronous unit further has at least one lower pivot seat. The lower pivot seat is disposed on the fixing seat and corresponds in position to the lower fixing arm. The lower pivot seat has a lower pivot hole therein. A lower crankshaft is provided and inserted through the lower pivot seat. The synchronous unit further has a plurality of crankshaft connecting levers. The crankshaft connecting levers are connected between the upper crankshaft and the lower crankshaft, respectively. The drive unit is connected to one of the upper crankshaft and the lower crankshaft for synchronously driving the upper crankshaft and the lower crankshaft through movement of the crankshaft connecting levers. The two transmission units are disposed in the upper fixing arm and the lower fixing arm, respectively. Each transmission unit has at least one positioning seat. The positioning seat has a positioning hole therein. A transmission shaft is provided and inserted through the positioning hole. An end of the transmission shaft is connected to the upper crankshaft or the lower crankshaft. Another end of the transmission shaft is connected with an eccentric block. The eccentric block is eccentrically connected with an end of an eccentric connecting lever. Another end of the eccentric connecting lever is connected with a slider. The slider is slidably disposed in the slide groove of the slide seat. The two clamping units are connected to the sliders of the two transmission units, respectively. The two clamping units are movable relative to the slide seat as the sliders slide. The scroll saw blade is inserted through the through hole of the worktable. Two ends of the scroll saw blade are connected to the clamping units, respectively.

When the drive unit is actuated by the user, the drive unit drives the upper crankshaft and the lower crankshaft to rotate synchronously through the crankshaft connecting levers, and the upper crankshaft and the lower crankshaft simultaneously bring the corresponding transmission shafts of the transmission units to rotate, and the transmission shafts bring the sliders to slide along the slide groove so as to bring the scroll saw blade to perform linear sawing operation. Because the synchronous unit is composed of the crankshaft connecting levers, the connection between the transmission shafts is relatively tight. This ensures that the transmission shafts do not generate a deviation in rotation to solve the vibration and noise problems caused by the gear or the belt used to drive the conventional scroll saw.

DETAILED DESCRIPTION OF THE PREFERRED EMBODIMENTS

Embodiments of the present invention will now be described, by way of example only, with reference to the accompanying drawings.

Figure 1:
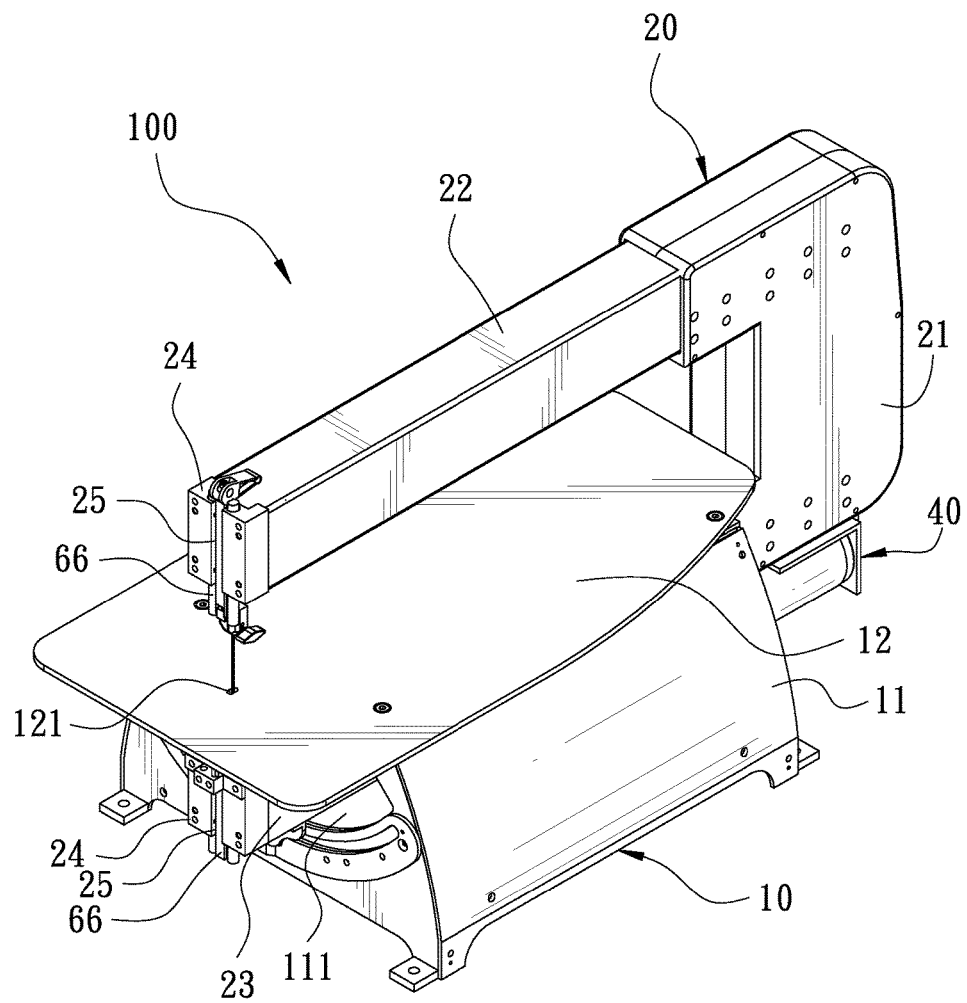
FIG. 1 is a perspective view according to a preferred embodiment of the present invention.
Figure 2:
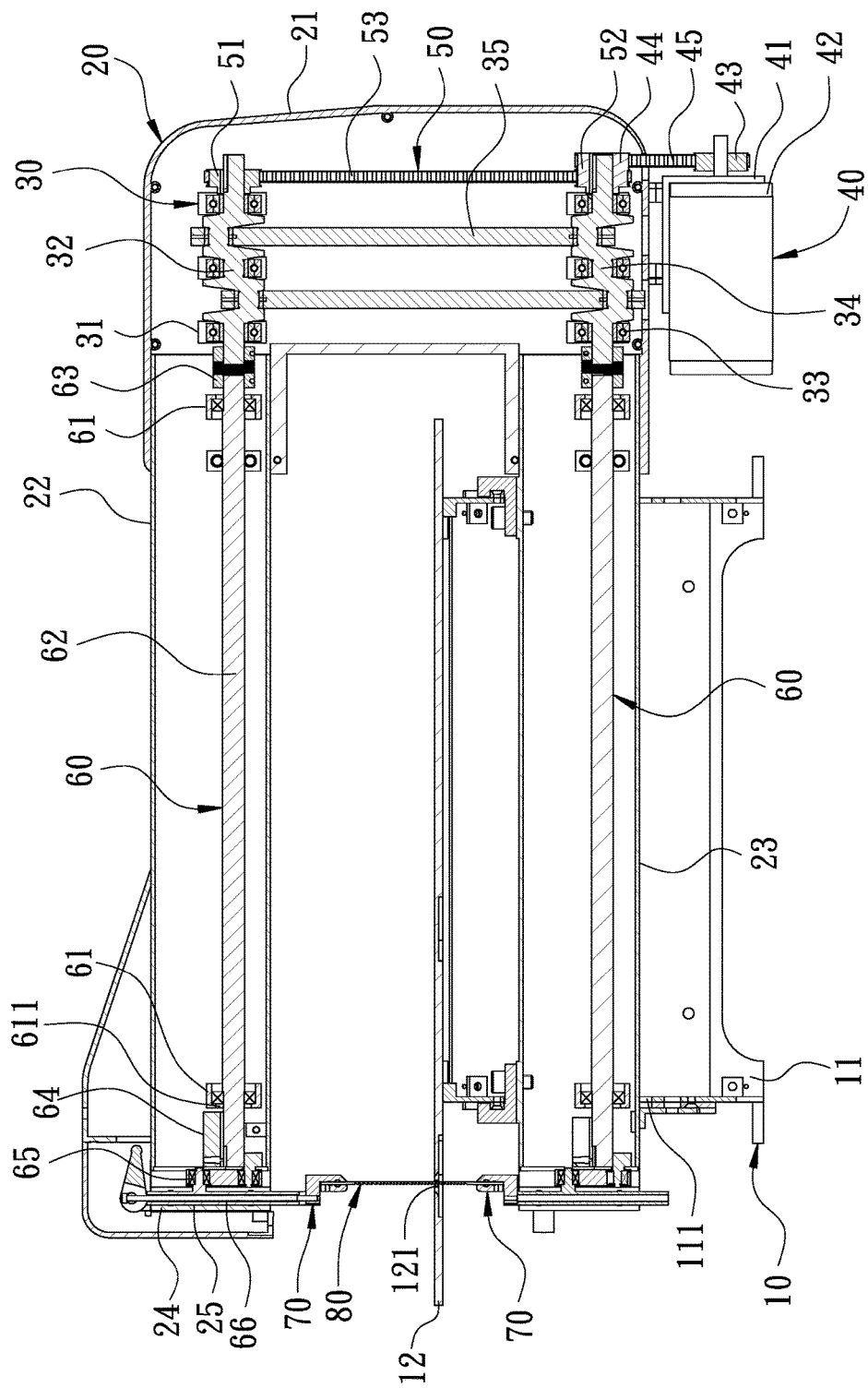
FIG. 2 is a sectional view according to the preferred embodiment of the present invention.

FIG. 1 is a perspective view according to a preferred embodiment of the present invention. FIG. 2 is a sectional view according to the preferred embodiment of the present invention. The present invention discloses a scroll saw 100. The scroll saw 100 comprises a machine base 10, a saw frame 20, a synchronous unit 30, a drive unit 40, an anti-reversal unit 50, two transmission units 60, two clamping units 70, and a scroll saw blade 80.

The machine base 10 has a base 11. A side surface of the base 11 is provided with a mounting hole 111. A worktable 12 is disposed on top of the base 11. The worktable 12 is provided with a through hole 121 longitudinally penetrating through the worktable 12 from top to bottom.

A saw frame 20 has a fixing seat 21. The fixing seat 21 is disposed at one side of the base 11. The fixing seat 21 is provided with an upper fixing arm 22 and a lower fixing arm 23. The upper fixing arm 22 and the lower fixing arm 23 extend in parallel toward the worktable 12. The upper fixing arm 22 is suspended above the worktable 12. The lower fixing arm 23 is inserted and fixed to the mounting hole 111 and located below the worktable 12. A free end of each of the upper fixing arm 22 and the lower fixing arm 23 is provided with a slide seat 24. The slide seat 24 is longitudinally provided with a slide groove 25 corresponding to the through hole 121.

The synchronous unit 30 is disposed in the fixing seat 21. The synchronous unit 30 has a plurality of upper pivot seats 31 spaced apart from each other on the fixing seat 21 and corresponding in position to the upper fixing arm 22. An upper crankshaft 32 is provided and inserted through the upper pivot seats 31. The synchronous unit 30 further has a plurality of lower pivot seats 33 spaced apart from each other on the fixing seat 21 and corresponding in position to the lower fixing arm 23. A lower crankshaft 34 is provided and inserted through the lower pivot seats 33. The synchronous unit 30 further has a plurality of crankshaft connecting levers 35. The crankshaft connecting levers 35 are connected between the upper crankshaft 32 and the lower crankshaft 34, respectively.

The drive unit 40 is disposed on the saw frame 20 and connected to one of the upper crankshaft 32 and the lower crankshaft 34 for synchronously driving the upper crankshaft 32 and the lower crankshaft 34 through the movement of the crankshaft connecting levers 35. In this embodiment, the drive unit 40 has a fixing frame 41. The fixing frame 41 is provided with a motor 42. The motor 42 is connected with a first turning wheel 43. The drive unit 40 further has a second turning wheel 44. The second turning wheel 44 is connected to the lower crankshaft 34. The drive unit 40 further has a drive belt 45. The drive belt 45 is wound on the first turning wheel 43 and the second turning wheel 44.

The anti-reversal unit 50 has an upper turning wheel 51 disposed on the upper crankshaft 32, a lower turning wheel 52 disposed on the lower crankshaft 34, and an anti-reversal belt 53 wound on the upper turning wheel 51 and the lower turning wheel 52.

The two transmission units 60 are disposed in the upper fixing arm 22 and the lower fixing arm 23, respectively. Each transmission unit 61 has a plurality of positioning seats 61 spaced from each other on the upper fixing arm 22 or the lower fixing arm 23. Each positioning seat 61 has a positioning hole 611 therein. A transmission shaft 62 is provided and inserted through the positioning hole 611. An end of the transmission shaft 62 is provided with a coupling 63, and is connected to the corresponding upper crankshaft 32 or the lower crankshaft 34 by means of the coupling 63. Another end of the transmission shaft 62 is connected with an eccentric block 64. The eccentric block 64 is eccentrically connected with an end of an eccentric connecting lever 65. Another end of the eccentric connecting lever 65 is connected with a slider 66. The slider 66 is slidably disposed in the slide groove 25 of the slide seat 24.

The two clamping units 70 are connected to the sliders 66 of the two transmission units 60 respectively, and can be moved relative to the slide seat 24 as the sliders 66 slide.

The scroll saw blade 80 is inserted through the through hole 121 of the worktable 12. Two ends of the scroll saw blade 80 are connected to the clamping units 70, respectively.

Thereby, when the drive unit 40 is actuated by the user, the drive unit 40 brings the lower crankshaft 34 to rotate, and the lower crankshaft 34 brings the upper crankshaft 32 to rotate synchronously through the crankshaft connecting levers 35. The upper crankshaft 32 and the lower crankshaft 34 bring the transmission shafts 61 of the two transmission units 60 to rotate simultaneously, so that the transmission shafts 61 bring the sliders 66 to slide along the slide groove 25 so as to bring the scroll saw blade 80 to perform the linear sawing operation straight up and down.

Figure 3:
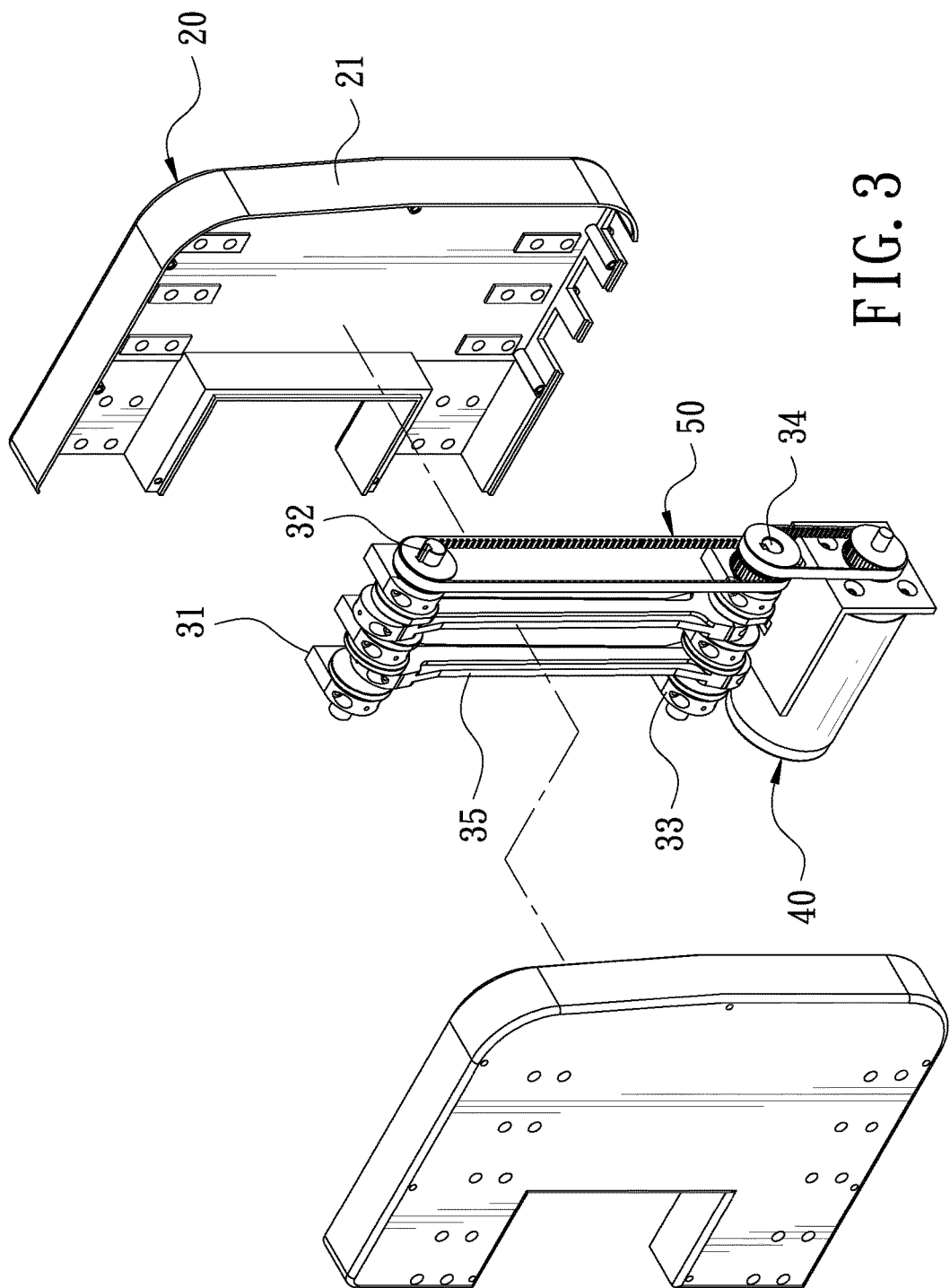
FIG. 3 is a perspective view showing the synchronous unit according to the preferred embodiment of the present invention.
Figure 4:
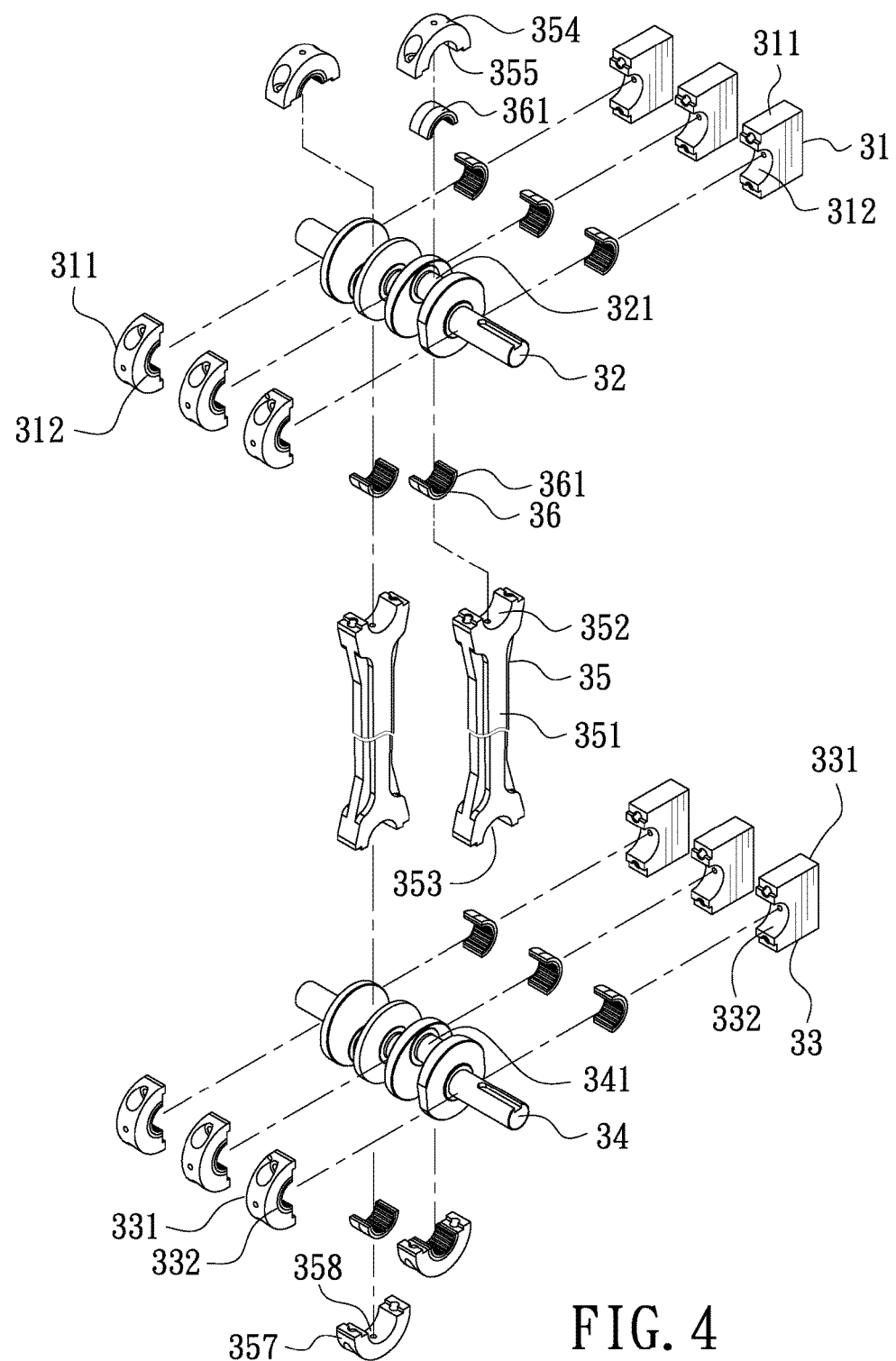
FIG. 4 is an exploded view showing the synchronous unit according to the preferred embodiment of the present invention.
Figure 5:
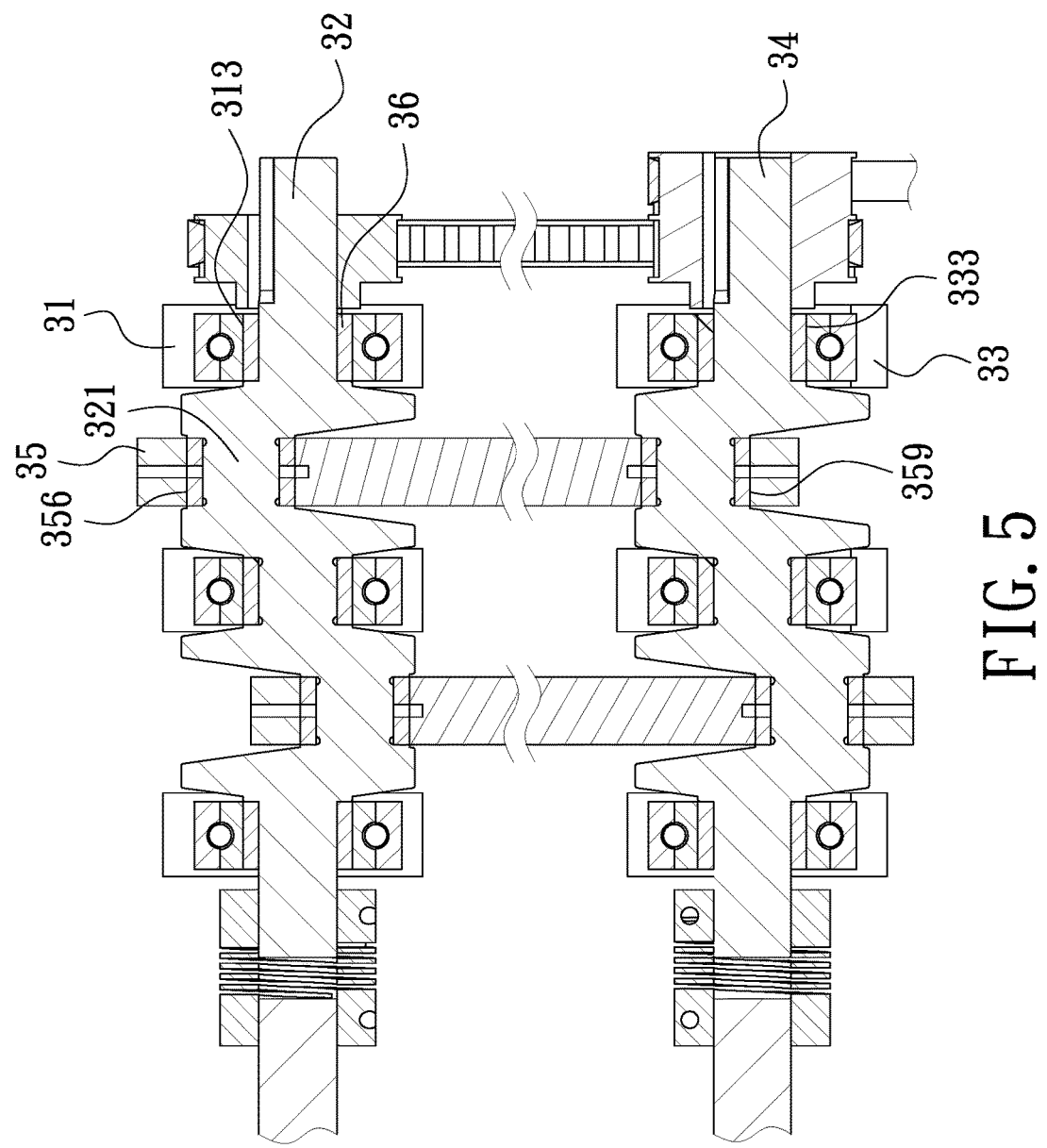
FIG. 5 is a sectional view showing the synchronous unit according to the preferred embodiment of the present invention.

FIG. 3 is a perspective view showing the synchronous unit according to the preferred embodiment of the present invention. FIG. 4 is an exploded view showing the synchronous unit according to the preferred embodiment of the present invention. FIG. 5 is a sectional view showing the synchronous unit according to the preferred embodiment of the present invention. The synchronous unit 30 has the structural features described below.

The upper pivot seat 31 is composed of a pair of seat blocks 311. Each seat block 311 has a half trough 312. When the pair of seat blocks 311 are coupled to each other, the half troughs 312 of the pair of seat blocks 311 jointly define an upper pivot hole 313 for insertion of the upper crankshaft 32. The upper crankshaft 32 has a plurality of upper connecting segments 321 which are eccentrically disposed.

The lower pivot seat 33 is composed of a pair of seat blocks 331. Each seat block 331 has a half trough 332. When the pair of seat blocks 331 are coupled to each other, the half troughs 332 of the pair of seat blocks 331 jointly define a lower pivot hole 333 for insertion of the lower crankshaft 34. The lower crankshaft 34 has a plurality of lower connecting segments 341 which are eccentrically disposed.

Each crankshaft connecting lever 35 has a lever body 351. Two ends of the lever body 351 are recessed with a first half trough 352 and a second half trough 353, respectively. The end provided with the first half trough 352 of the lever body 351 is covered with an upper cover 354. The upper cover 354 has a third half trough 355 corresponding to the first half trough 352. The first half trough 352 and the third half trough 355 jointly define an upper receiving hole 356 to receive a corresponding one of the upper connecting segments 321 of the upper crankshaft 32. The end provided with the second half trough 353 of the lever body 351 is covered with a lower cover 357. The lower cover 357 has a fourth half trough 358 corresponding to the second half trough 353. The second half trough 353 and the fourth half trough 358 jointly define a lower receiving hole 359 to receive a corresponding one of the lower connecting segments 341 of the lower crankshaft 34.

A plurality of bearings 36 are provided in each upper pivot hole 313, each lower pivot hole 333, each upper receiving hole 356, and each lower receiving hole 356, respectively. In this embodiment, each bearing 36 is composed of a pair of half bearings 361.

Figure 6:
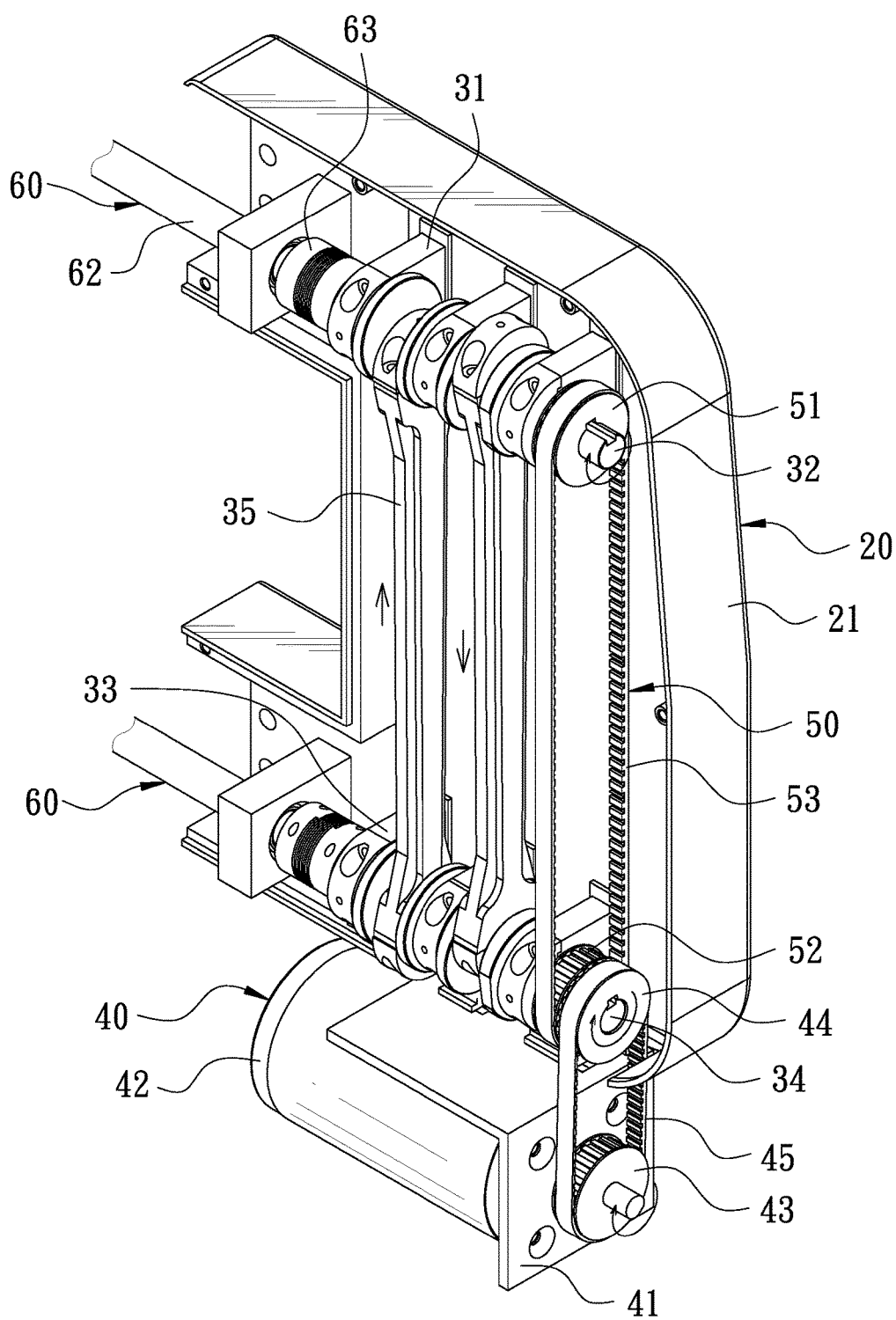
FIG. 6 is a schematic view showing the operation of the synchronous unit according to the preferred embodiment of the present invention.

FIG. 6 is a schematic view showing the operation of the synchronous unit according to the preferred embodiment of the present invention. When the drive unit 40 is actuated by the user, the motor 42 drives the first turning wheel 43 to rotate and the first turning wheel 43 brings the second turning wheel 44 to rotate through the drive belt 45 so that the second turning wheel 44 brings the lower crankshaft 34 to rotate synchronously. The upper crankshaft 32 is rotated in synchronism with the lower crankshaft 34 through the crankshaft connecting levers 35. The upper crankshaft 32 and the lower crankshaft 34 simultaneously bring the corresponding transmission shafts 62 to rotate. Because the upper crankshaft 32 and the lower crankshaft 34 are connected to each other through the crankshaft connecting levers 35, without any gear backlash or belt tension, the connection between the transmission shafts 62 is relatively tight. This ensures that the transmission shafts 62 do not generate a deviation in rotation to solve the problems of vibration and noise caused by the gear or the belt used to drive the conventional scroll saw.

In order to prevent reversal when the crankshaft connecting levers 35 reach the dead point to cause that the upper crankshaft 32 and the lower crankshaft 34 are rotated in different directions and that the mechanism may be stuck, the anti-reversal unit 50 is provided between the upper crankshaft 32 and the lower crankshaft 34. Thereby, when the lower crankshaft 34 starts to rotate, the lower turning wheel 52 is driven to rotate synchronously, and the lower turning wheel 52 brings the upper turning wheel 51 to rotate through the anti-reversal belt 53, and the upper turning wheel 51 brings the upper crankshaft 32 to rotate to ensure that the upper crankshaft 32 and the lower crankshaft 34 are rotated in the same direction.

It is worth mentioning that the present invention provides the bearing 36 in each upper pivot hole 313, each lower pivot hole 333, each upper receiving hole 356 and each lower receiving hole 359 respectively, so that the synchronous unit can be operated more smoothly to reduce the heat generated by the running friction.

Figure 7:
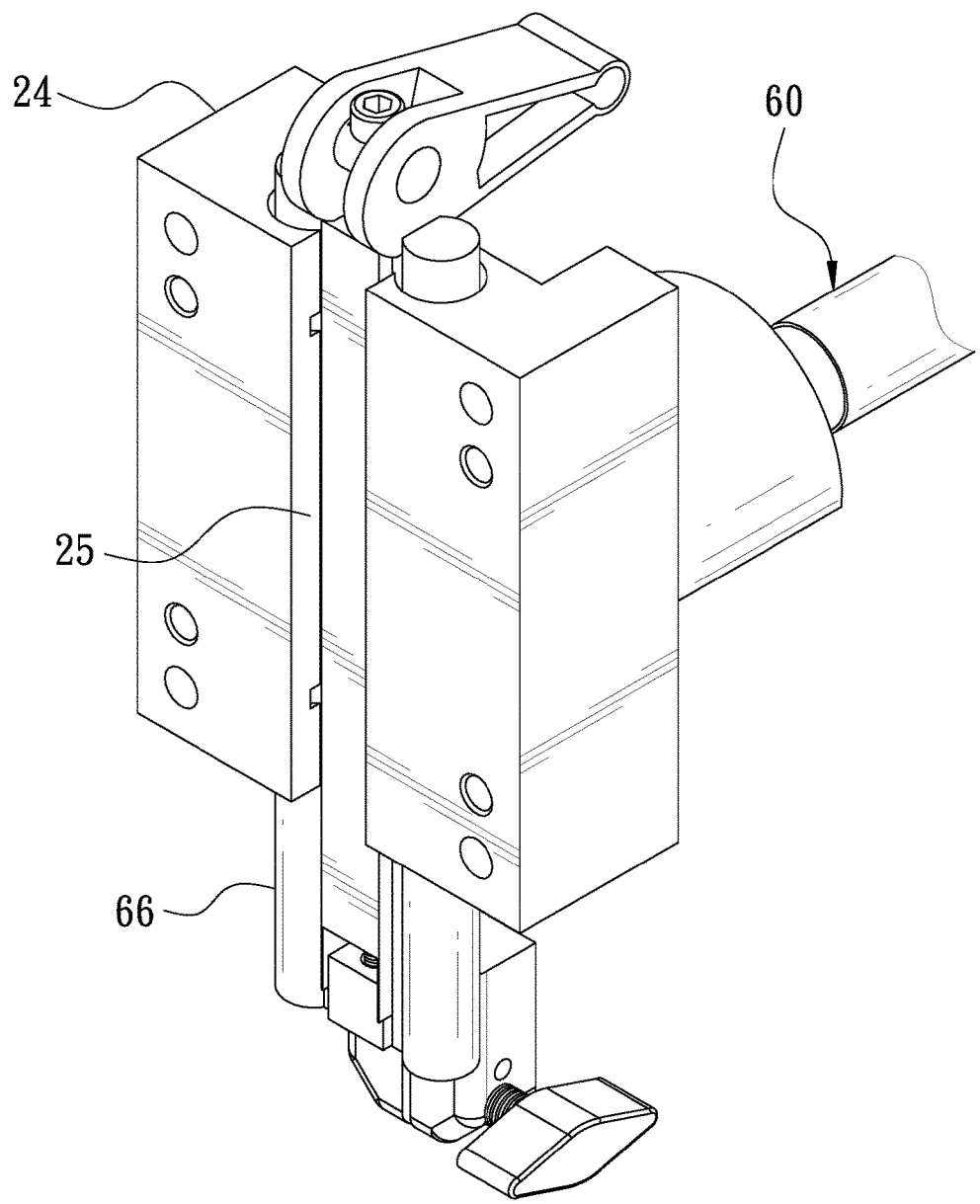
FIG. 7 is a perspective view showing the transmission unit according to the preferred embodiment of the present invention.
Figure 8:
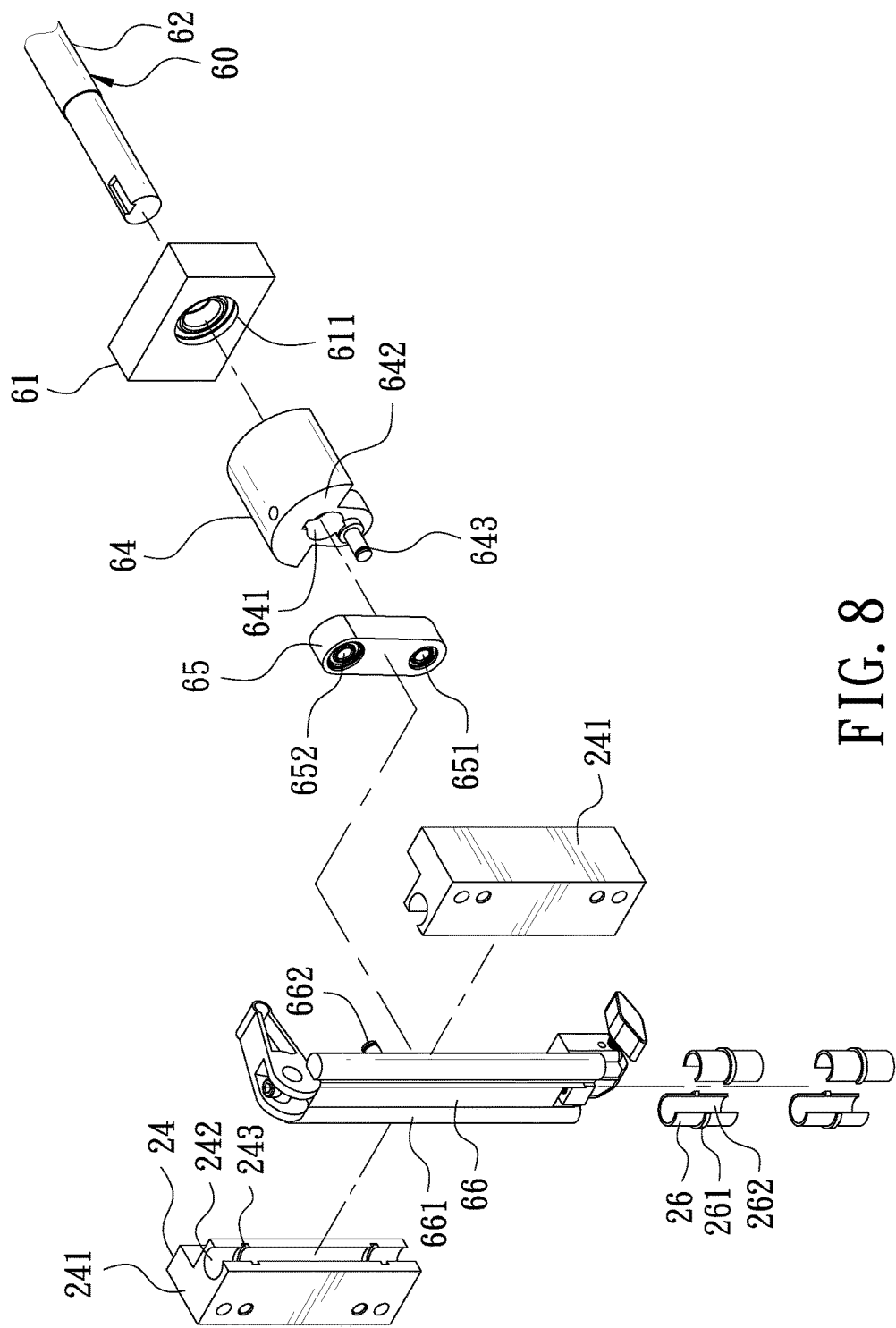
FIG. 8 is an exploded view showing the transmission unit according to the preferred embodiment of the present invention.

FIG. 7 is a perspective view showing the transmission unit according to the preferred embodiment of the present invention. FIG. 8 is an exploded view showing the transmission unit according to the preferred embodiment of the present invention. The scroll saw 100 further has the features described hereinafter.

The slide seat 24 is composed of two half segments 241 which are disposed oppositely and spaced a predetermined distance apart from each other to form the slide groove 25. A side wall of each of the half segments 241, corresponding to the slide groove 25, is provided with a limit groove 242. Furthermore, an inner wall of the limit groove 242 is provided with a plurality of fixing grooves 243 and a plurality of bearings 26. A circumferential side of each bearing 26 is annularly provided with a flange 261. The flange 261 is engaged in the fixing groove 243, so that the bearing 26 is positioned in the limit groove 242. The bearing 26 is provided with a slit 262 corresponding to the slide groove 25. The bearing 26 may be a self-lubricating bearing or a linear bearing.

The transmission unit 60 further has the following features:

The eccentric block 64 is provided with a perforation 641 for insertion of the transmission shaft 62, and the eccentric block 64 is fixed to the transmission shaft 62. One side of the eccentric block 64 is provided a semicircular weight part 642. The eccentric block 64 is provided with a first connecting post 643 which is eccentrically disposed.

An end of the eccentric connecting lever 65 is provided with a first connecting hole 651 corresponding to the first connecting post 643. The first connecting post 643 is inserted in the first connecting hole 651, so that the eccentric connecting lever 65 is connected to the eccentric block 64. Another end of the eccentric connecting lever 65 is provided with a second connecting hole 652.

Two sides of the slider 66 are provided with limit portions 661 respectively corresponding to the limit grooves 242 of the two half segments 24. The limit portions 661 are slidably disposed in the corresponding limit grooves 242 to pass through the split 262 of the bearing 26. The slider 66 is provided with a second connecting post 662 corresponding to the second connecting hole 652. The second connecting post 662 is inserted through the second connecting hole 652, so that the slider 66 is connected to the eccentric connecting lever 65.

Figure 9:
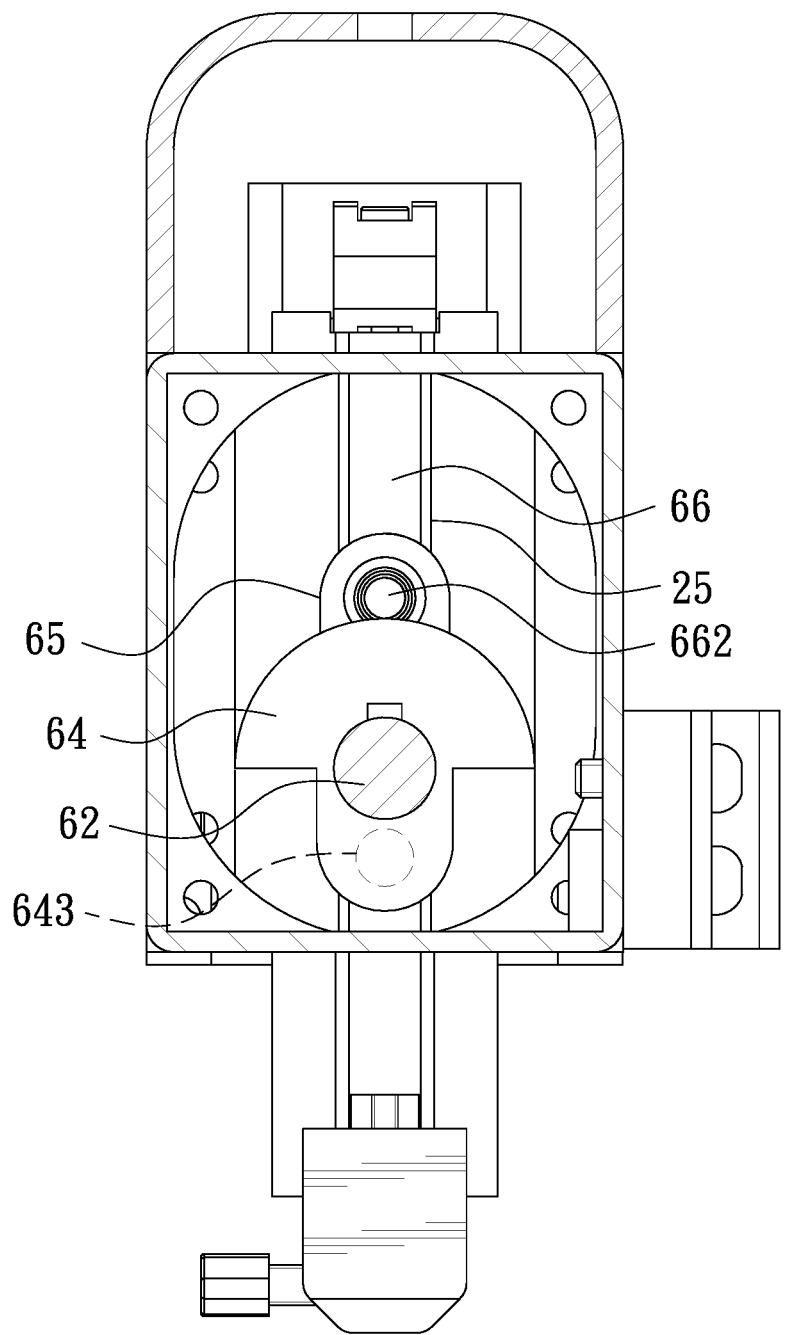
FIG. 9 is a schematic view showing the operation of the transmission unit according to the preferred embodiment of the present invention.
Figure 10:
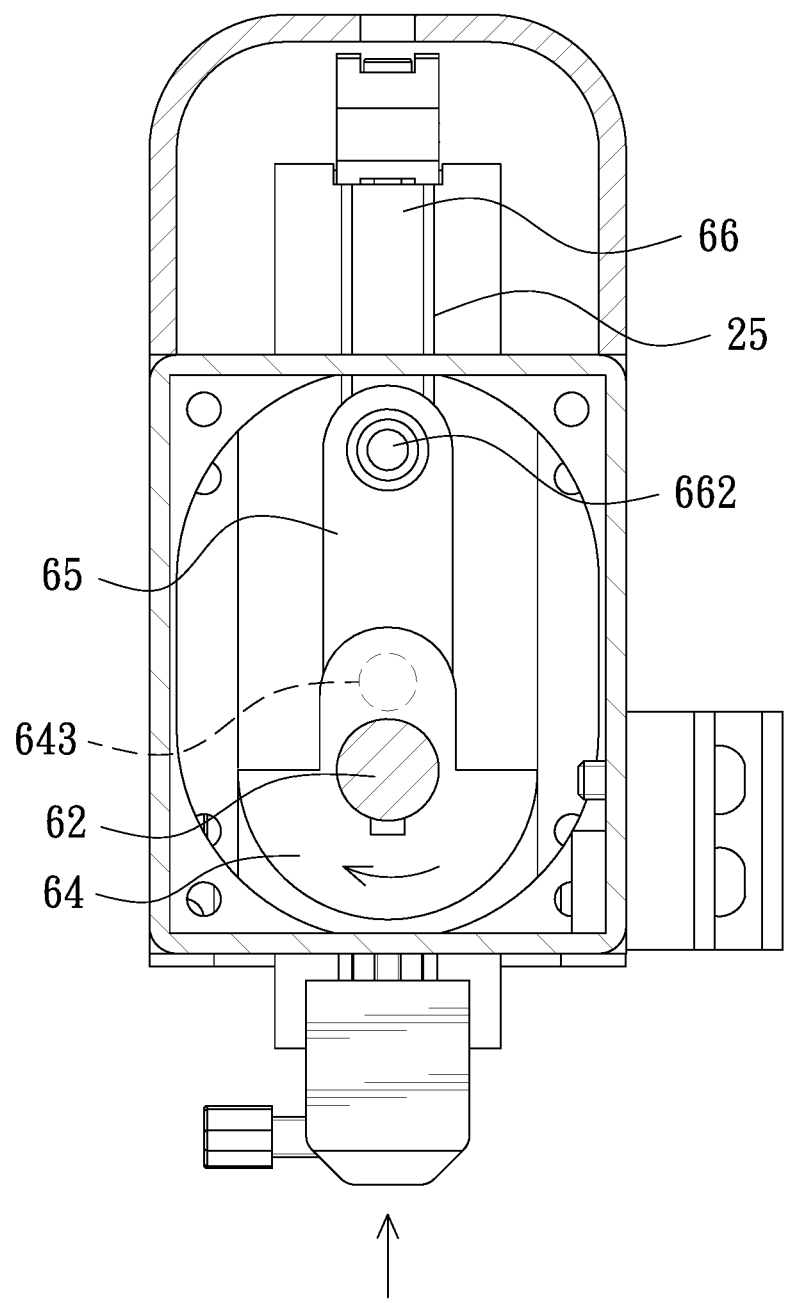
FIG. 10 is another schematic view showing the operation of the transmission unit according to the preferred embodiment of the present invention.

FIG. 9 is a schematic view showing the operation of the transmission unit according to the preferred embodiment of the present invention. FIG. 10 is another schematic view showing the operation of the transmission unit according to the preferred embodiment of the present invention. The eccentric connecting lever 65 is eccentrically disposed relative to the transmission shaft 62 because one end of the eccentric connecting lever 65 is connected to the first connecting post 643. Therefore, when the transmission shaft 62 starts rotating, the eccentric connecting lever 65 is driven by the eccentric block 64 to rotate about the transmission shaft 62. The other end of the eccentric connecting lever 65 is connected to the slider 66 through the second connecting post 662. The slider 66 is slidably mounted in the slide groove 25, so that the slider 66 can be linearly reciprocated along the slide groove 25 to link the scroll saw blade 80 to perform linear sawing operation straight up and down. Since the limit portions 661 of the slider 66 slidably pass through the bearings 26, the bearing 26 provide a lubricating effect to solve the problem of heat generated by friction. Thus, the scroll saw 100 can be used for a long time.

Figure 11:
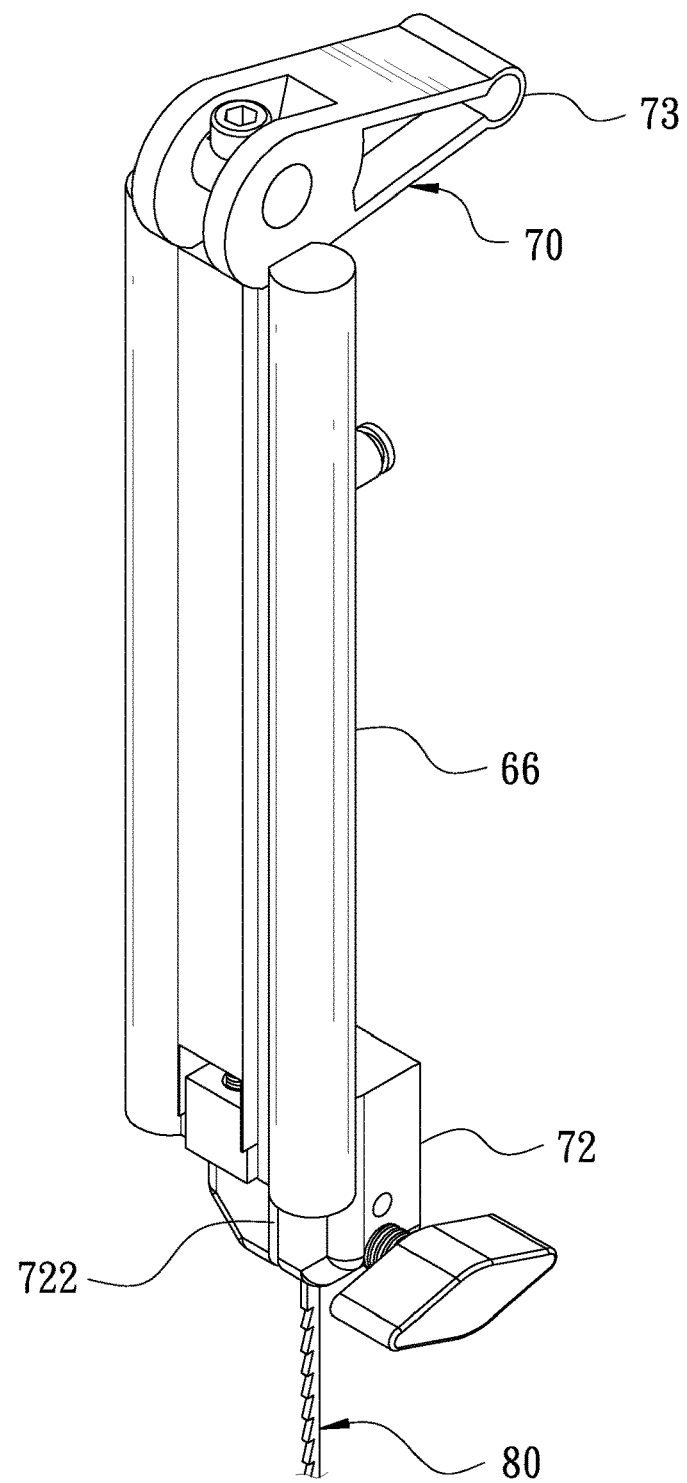
FIG. 11 is a perspective view showing the clamping unit according to the preferred embodiment of the present invention.
Figure 12:
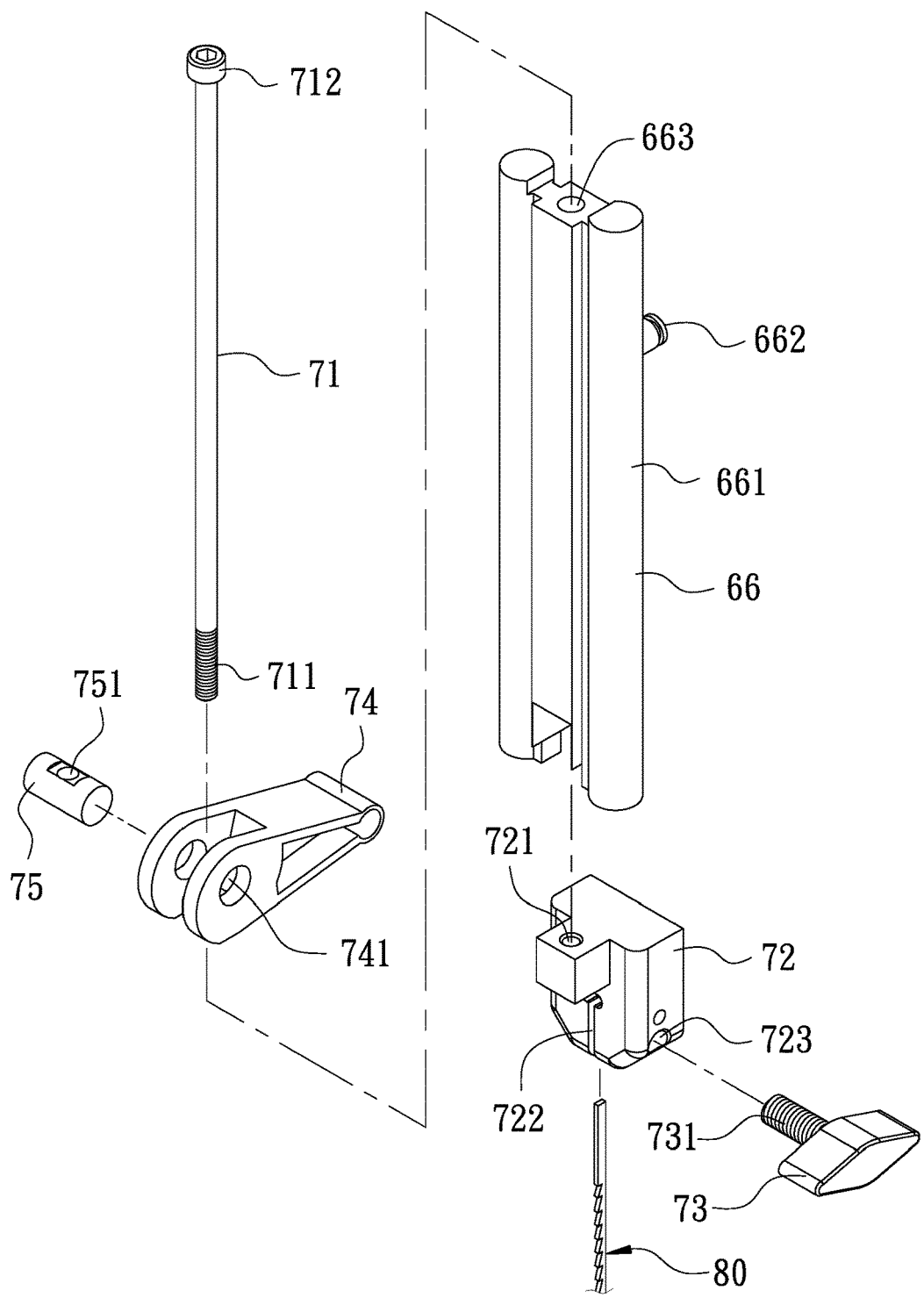
FIG. 12 is an exploded view showing the clamping unit according to the preferred embodiment of the present invention.

FIG. 11 is a perspective view showing the clamping unit according to the preferred embodiment of the present invention. FIG. 12 is an exploded view showing the clamping unit according to the preferred embodiment of the present invention. The slider 66 is longitudinally provided with a slide hole 663 corresponding to the slide groove 25. The clamping unit 70 has a slide rod 71. The slide rod 71 is inserted into the slide hole 663. An end of the slide rod 71, facing the worktable 12, is connected to a clamping block 72. The clamping block 72 is provided with a first screw hole 721. The end of the slide rod 71 is provided with a threaded portion 711. The threaded portion 711 is screwed to the first screw hole 721, so that the clamping block 72 is fixed to the slide rod 71. The clamping block 72 has a groove 722 for accommodating one end of the scroll saw blade 80. The clamping block 72 further has a second screw hole 723 communicating with the groove 722. A turning knob 73 is screwed to the second screw hole 723. The turning knob 73 has a screw bolt 731. The screw bolt 731 is inserted through the second screw hole 723 to hold against the scroll saw blade 80, such that the scroll saw blade 80 is fixed to the clamping block 72. Another end of the slide rod 71 is connected with a pull handle 74. The pull handle 74 is provided with an eccentric hole 741 and a fixing pin 75 in the eccentric hole 741. The fixing pin 75 has a through hole 751. The slide rod 71 is provided with a head portion 712 having a diameter greater than that of the through hole 751. The slide rod 71 is successively inserted through the through hole 751 and the slide hole 663, with the head portion 712 to fix the pull handle 74 on the top surface of the slider 66.

Figure 13:
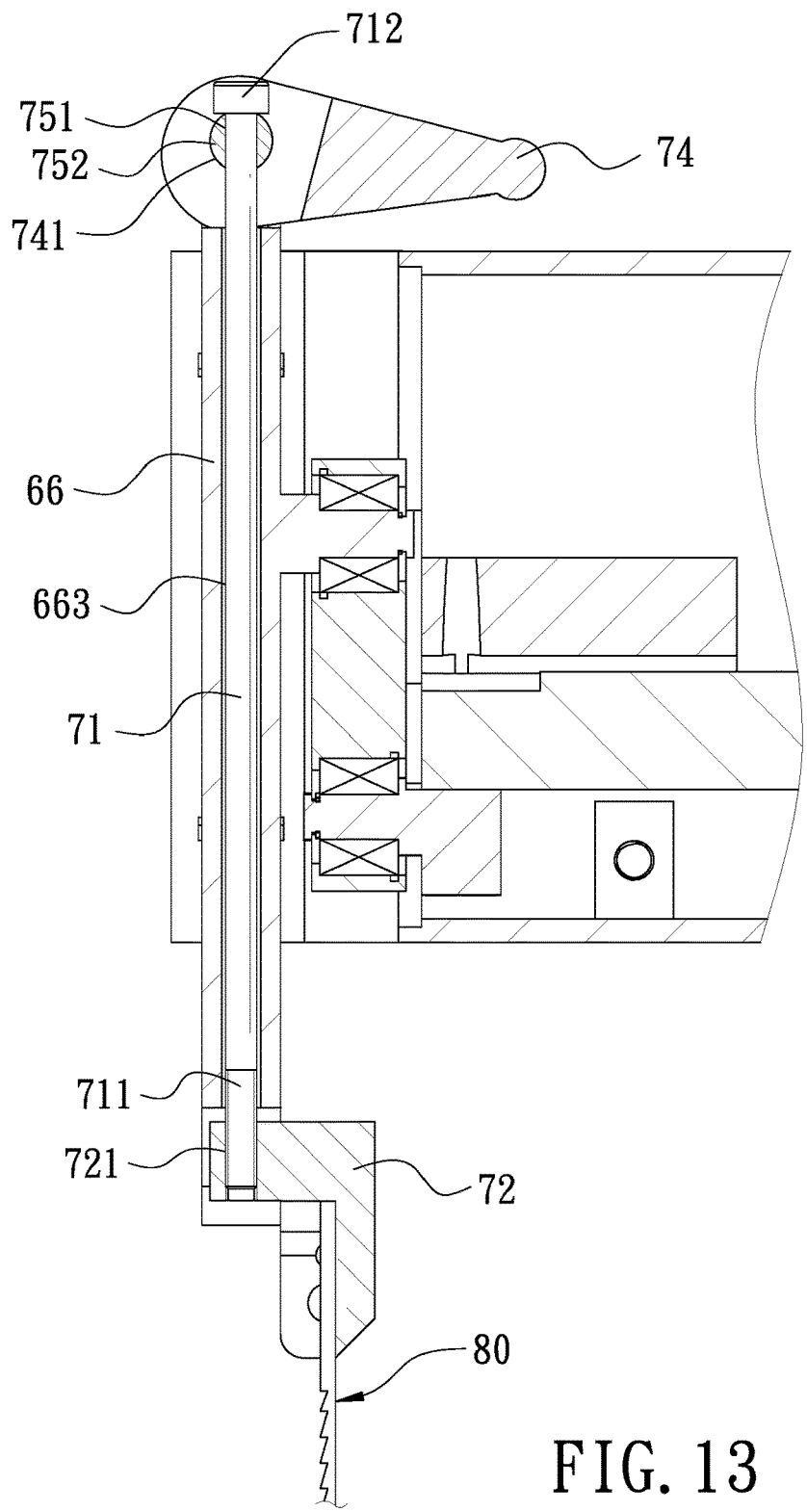
FIG. 13 is a schematic view showing the operation of the clamping unit according to the preferred embodiment of the present invention.
Figure 14:
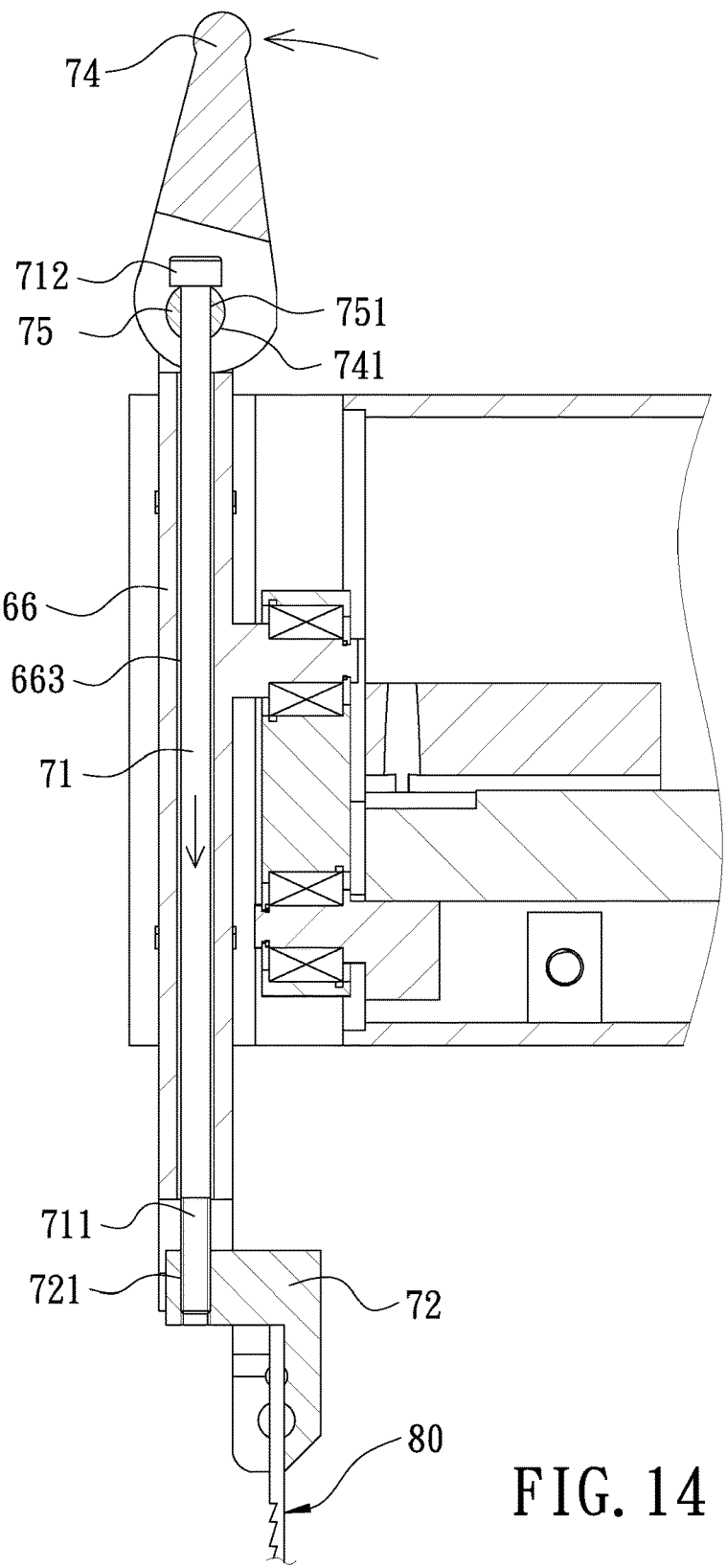
FIG. 14 is another schematic view showing the operation of the clamping unit according to the preferred embodiment of the present invention.

FIG. 13 is a schematic view showing the operation of the clamping unit according to the preferred embodiment of the present invention. FIG. 14 is another schematic view showing the operation of the clamping unit according to the preferred embodiment of the present invention. The slide rod 71 is inserted through the fixing pin 75, and the fixing pin 75 is eccentrically secured to the pull handle 74. As shown in FIG. 14, when the user wants to replace the scroll saw blade 80, the pull handle 74 is pulled upward, and then the slide rod 71 slides downward to release the scroll saw blade 80. Upon completion of the replacement, the user simply pulls the pull handle 74 again to pull the slide rod 71 upwardly to tighten the scroll saw blade 80. Thereby, the scroll saw blade 80 can be replaced quickly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:
1. A scroll saw, comprising:
a machine base, having a base, a side surface of the base being provided with a mounting hole, a worktable being disposed on top of the base, the worktable being provided with a through hole longitudinally penetrating through the worktable from top to bottom;
a saw frame, having a fixing seat, the fixing seat being disposed at one side of the base, the fixing seat being provided with an upper fixing arm and a lower fixing arm, the upper fixing arm and the lower fixing arm extending in parallel toward the worktable, the upper fixing arm being suspended above the worktable, the lower fixing arm being inserted and fixed to the mounting hole and located below the worktable, a free end of each of the upper fixing arm and the lower fixing arm being provided with a slide seat, the slide seat being longitudinally provided with a slide groove corresponding to the through hole;
a synchronous unit, disposed in the fixing seat, the synchronous unit having at least one upper pivot seat, the upper pivot seat being disposed on the fixing seat and corresponding in position to the upper fixing arm, the upper pivot seat having an upper pivot hole therein, an upper crankshaft being provided and inserted through the upper pivot seat, the synchronous unit further having at least one lower pivot seat, the lower pivot seat being disposed on the fixing seat and corresponding in position to the lower fixing arm, the lower pivot seat having a lower pivot hole therein, a lower crankshaft being provided and inserted through the lower pivot seat, the synchronous unit further having a plurality of crankshaft connecting levers, the crankshaft connecting levers being connected between the upper crankshaft and the lower crankshaft respectively;
a drive unit, connected to one of the upper crankshaft and the lower crankshaft for synchronously driving the upper crankshaft and the lower crankshaft through movement of the crankshaft connecting levers;
two transmission units, disposed in the upper fixing arm and the lower fixing arm respectively, each transmission unit having at least one positioning seat, the positioning seat having a positioning hole therein, a transmission shaft being provided and inserted through the positioning hole, an end of the transmission shaft being connected to the upper crankshaft or the lower crankshaft, another end of the transmission shaft being connected with an eccentric block, the eccentric block being eccentrically connected with an end of an eccentric connecting lever, another end of the eccentric connecting lever being connected with a slider, the slider being slidably disposed in the slide groove of the slide seat;
two clamping units, connected to the sliders of the two transmission units respectively, the two clamping units being movable relative to the slide seat as the sliders slide;
a scroll saw blade, inserted through the through hole of the worktable, two ends of the scroll saw blade being connected to the clamping units respectively; and
the upper crankshaft having a plurality of upper connecting segments, the lower crankshaft having a plurality of lower connecting segments, an end of each of the crankshaft connecting levers being provided with an upper receiving hole to receive a corresponding one of the upper connecting segments of the upper crankshaft, and another end of each of the crankshaft connecting levers being provided with a lower receiving hole to receive a corresponding one of the lower connecting segments of the lower crankshaft.

2. The scroll saw as claimed in claim 1, wherein the upper pivot seat is composed of a pair of seat blocks, each seat block of the upper pivot seat has a half trough, the half troughs of the pair of seat blocks of the upper pivot seat jointly define the upper pivot hole, the lower pivot seat is composed of a pair of seat blocks, each seat block of the lower pivot seat has a half trough, and the half troughs of the pair of seat blocks of the lower pivot seat jointly define the lower pivot hole.

3. The scroll saw as claimed in claim 2, further comprising a plurality of bearings disposed in the upper pivot hole and the lower pivot hole respectively.

4. The scroll saw as claimed in claim 1, wherein each crankshaft connecting lever has a lever body, two ends of the lever body are recessed with a first half trough and a second half trough respectively, the end provided with the first half trough of the lever body is covered with an upper cover, the upper cover has a third half trough corresponding to the first half trough, the first half trough and the third half trough jointly define the upper receiving hole, the end provided with the second half trough of the lever body is covered with a lower cover, the lower cover has a fourth half trough corresponding to the second half trough, and the second half trough and the fourth half trough jointly define the lower receiving hole.

5. The scroll saw as claimed in claim 4, further comprising a plurality of bearings disposed in the upper receiving hole and the lower receiving hole respectively.

6. The scroll saw as claimed in claim 1, further comprising a unit, the unit having an upper turning wheel disposed on the upper crankshaft, a lower turning wheel disposed on the lower crankshaft, and a belt wound on the upper turning wheel and the lower turning wheel.

7. The scroll saw as claimed in claim 1, wherein the drive unit has a fixing frame, the fixing frame is provided with a motor, the motor is connected with a first turning wheel, the drive unit further has a second turning wheel, the second turning wheel is connected to the upper crankshaft or the lower crankshaft, the drive unit further has a drive belt, and the drive belt is wound on the first turning wheel and the second turning wheel.

8. The scroll saw as claimed in claim 1, wherein the eccentric block of each transmission unit is provided with a first connecting post, an end of the eccentric connecting lever is provided with a first connecting hole corresponding to the first connecting post, the first connecting post is inserted in the first connecting hole so that the eccentric connecting lever is connected to the eccentric block, another end of the eccentric connecting lever is provided with a second connecting hole, the slider is provided with a second connecting post corresponding to the second connecting hole, and the second connecting post is inserted through the second connecting hole so that the slider is connected to the eccentric connecting lever.

9. The scroll saw as claimed in claim 1, wherein the slide seat is composed of two segments which are disposed oppositely and spaced a predetermined distance apart from each other to form the slide groove, a side wall of each of the segments, corresponding to the slide groove, is provided with a limit groove, two sides of the slider are provided with limit portions respectively corresponding to the limit grooves of the two segments, and the limit portions are slidably disposed in the limit grooves of the two segments.

10. The scroll saw as claimed in claim 9, wherein an inner wall of the limit groove is provided with a plurality of fixing grooves, each of the fixing grooves is provided with a bearing, and the bearing is provided with a slit corresponding to the slide groove, enabling the limit portions of the slider to be inserted through the bearing.

11. The scroll saw as claimed in claim 1, wherein the slider is longitudinally provided with a slide hole corresponding to the slide groove, each of the clamping units has a slide rod, the slide rod is inserted into the slide hole, an end of the slide rod, facing the worktable, is connected to a clamping block, and another end of the slide rod is connected with a pull handle.

* * * * *